United States Patent [19]

Martin

[11] 3,808,539

[45] Apr. 30, 1974

[54] POWER REGULATOR CIRCUIT FOR A RADIO TRANSMITTER

[75] Inventor: Robert J. Martin, Lynchburg, Va.

[73] Assignee: General Electric Company, Lynchburg, Va.

[22] Filed: Oct. 6, 1972

[21] Appl. No.: 295,561

[52] U.S. Cl. ................. 325/105, 325/144, 325/159, 325/186, 332/38

[51] Int. Cl. ............................................ H04b 1/04

[58] Field of Search ........... 325/105, 144, 159, 186, 325/187; 330/16, 19, 22, 25, 127, 142; 332/37 R, 38

[56] References Cited

UNITED STATES PATENTS

| | | | |
|---|---|---|---|
| 3,207,999 | 9/1965 | Carruth et al. | 330/25 X |
| 3,281,697 | 10/1966 | Hansen et al. | 325/186 X |
| 3,460,048 | 8/1969 | Fichtner | 330/25 |
| 3,424,993 | 1/1969 | Clar | 325/105 X |

*Primary Examiner*—Benedict V. Safourek

[57] ABSTRACT

In a battery-powered radio transmitter, the radio frequency (rf) output power of amplifier and/or frequency multiplier stages is maintained more nearly constant, despite changes in battery voltage, by a regulator circuit. A feedback resistor is provided in the emitter-collector path of a transistor in a later stage to develop a direct current feedback voltage for the emitter-collector path of the transistor of an earlier stage. This feedback voltage biases the earlier transistor so that as the battery voltage (and hence rf output power) decreases, the gain of the earlier stage is increased to maintain the rf output power more nearly constant.

2 Claims, 3 Drawing Figures

POWER REGULATOR CIRCUIT FOR A RADIO TRANSMITTER

BACKGROUND OF THE INVENTION

My invention relates to a regulator circuit, and particularly to a regulator circuit for maintaining the radio frequency output power of a battery-powered transmitter more nearly constant.

In the radio industry, there has been a decided trend towards the utilization of transistors and other solid state devices. Because of this trend, vacuum tubes have been eliminated in many radio transmitters, particularly the portable or mobile radio transmitters. This has permitted the radio transmitters to be powered by batteries so as to eliminate the need for conventional 60 cycle power. However, this trend from vacuum tubes to transistors and from 60 cycle power to batteries has presented certain problems. A major problem has been that as the battery voltage decreases, the radio frequency (rf) output power of the transmitter also decreases. Where vacuum tubes are used, tube saturation is relatively easily obtained in most stages of the transmitter, and this saturation reduces or eliminates the problem of reduced output power. However, where transistors are used, saturation is not so easily obtained, particularly where the battery voltage has decreased. In addition, users of transmitters, particularly portable or mobile transmitters, prefer that the volume and weight of the transmitter be as small and as light as possible. Thus, very little space and weight are allowed for batteries, with the result that the batteries have relatively low power capability and relatively short life in terms of output voltage.

Accordingly, an object of my invention is to provide a circuit which maintains the radio frequency output power of a battery-powered, all transistor transmitter more nearly constant, despite decline in the voltage output of the battery.

Another object of my invention is to provide an improved rf power regulator circuit for a battery-powered, transistorized radio transmitter, the regulator circuit being relatively simple and easy to provide in early stages of the transmitter.

Another object of my invention is to provide a circuit that regulates the rf output power of a radio transmitter relatively constant, despite the fact that the transmitter utilizes transistors which are powered by a battery whose voltage declines.

SUMMARY OF THE INVENTION

Briefly, these and other objects are achieved in accordance with my invention by a regulator circuit having a feedback path from a later radio frequency stage of a transmitter to an earlier radio frequency stage of the transmitter. In the later stage, a feedback resistor is connected to the transistor, so as to provide a voltage indicative of the radio frequency power produced by that transistor. This voltage is fed through a direct current path to the transistor in the earlier stage, so that the earlier stage transistor is biased solely by this feedback voltage. As the output power of the transmitter tends to increase, the earlier stage transistor is biased so as to reduce the output power; and as the output power of the transmitter tends to decrease, the earlier stage transistor is biased so as to increase the output power. The regulator circuit utilizes already existing circuits in a typical radio transmitter, and does not affect any part of the transmitter operation other than the tendency to maintain the radio frequency output power more nearly constant.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
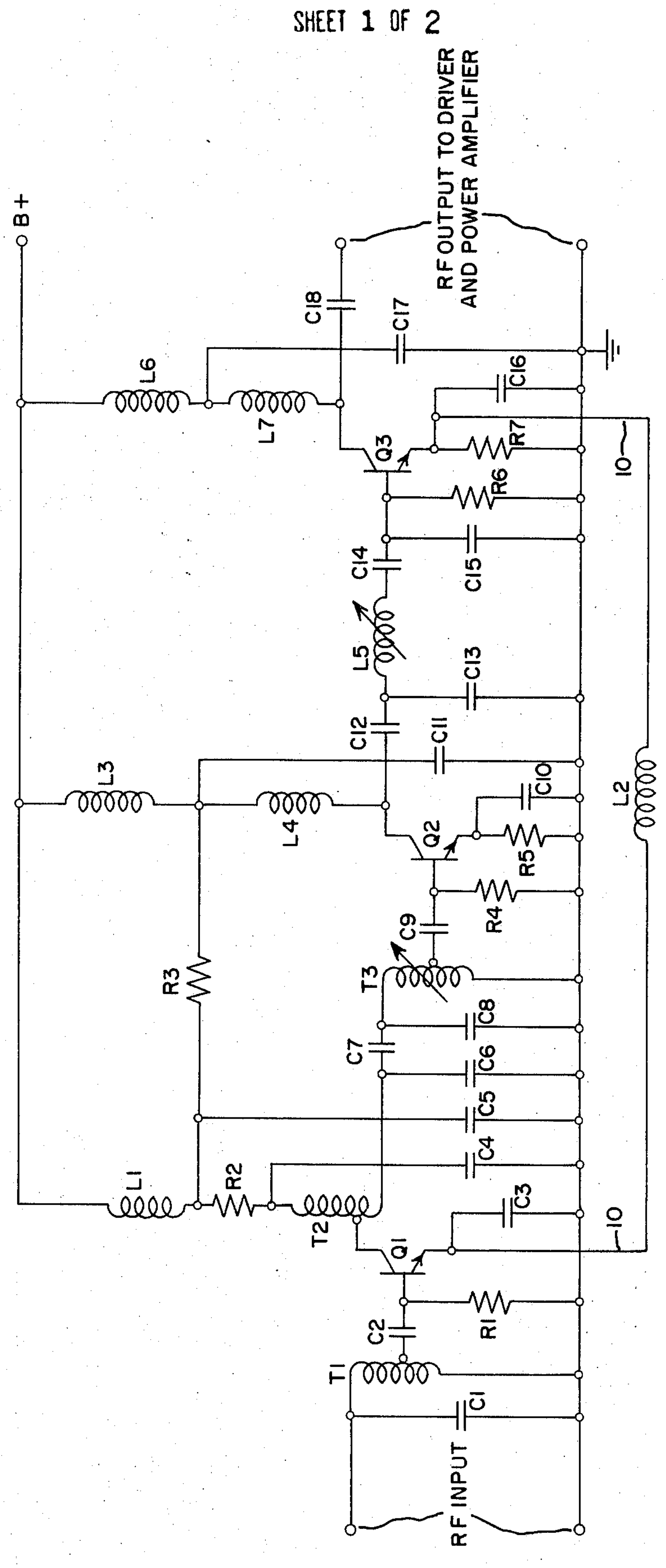
FIG. 1 shows a schematic diagram of a portion of a transistorized radio transmitter which is provided with a power regulator circuit in accordance with my invention.

In FIG. 1, I have shown a portion of a transistorized, battery-powered personal (i.e. hand carried) radio transmitter that utilizes my invention. This portion is located in the radio frequency (rf) stages of the transmitter. It receives modulated radio frequency signals, and amplifies and increases the frequency of these signals for the driver and power amplifier stages of the transmitter. The earlier stages and the driver and power amplifier stages of the transmitter are not shown, but persons skilled in the art are familiar with such circuits, and will understand the operation of my invention in connection with them. Battery-power, represented by a source of potential B+, is applied to the transmitter and to various portions of the circuit of FIG. 1 through filtering inductors L1, L3, L4, L6, and L7. This source of potential B+ is positive with respect to the indicated ground or point of reference potential. In the circuit of FIG. 1, I have shown three NPN type transistors Q1, Q2, and Q3 which, in this embodiment, are provided for amplification and frequency multiplication. However, whether the transistors perform the amplification function only, or the frequency multiplication function only, or both functions is not important or critical as far as the operation of my invention is concerned.

Radio frequency signals, which I have assumed to be modulated, are applied to the circuit of FIG. 1 at a tuned circuit comprising a capacitor C1 and a transformer T1. An appropriate voltage is coupled from this circuit through a capacitor C2 to the base of the transistor Q1. The collector of the transistor Q1 is coupled through a transformer T2, a resistor R2, and the inductor L1 to the source of potential B+. The emitter of the transistor Q1 is bypassed to ground by a capacitor C3, but more importantly, is biased only by my improved feedback regulator circuit generally indicated by the reference numeral 10. This circuit 10 will be described in detail hereinafter. Output signals are derived from the collector of the transistor Q1, and supplied through a capacitor C7 to a tuned circuit comprising a capacitor C8 and a transformer T3. A suitable voltage from the transformer T3 is supplied through a capacitor C9 to the base of the transistor Q2. Output signals from the transistor Q2 are derived at its collector, and supplied through a capacitor C12, an inductor L5, and a capacitor C14 to the base of the transistor Q3. The collector of the transistor Q3 is connected through the inductors L7, L6 to the source of potential B+, and is also connected through a capacitor C18 to the output of the circuit of FIG. 1. This output is supplied to the transmitter driver and power amplifier circuit for connection to an antenna. The emitter of the transistor Q3 is connected through a resistor R7 to the point of reference potential, and is also connected through a bypass capacitor C16 to the point of reference potential.

The circuit shown in FIG. 1 (other than the circuit 10) and as described thus far is known and is generally typical. In addition to the specific components mentioned, the circuit also includes suitable resistors and capacitors for supplying the necessary voltages, bias voltages, and bypass and coupling circuits. These other components are generally familiar to persons skilled in the art, and their function need not be specifically described. In accordance with my invention, I connect the emitter of the later stage transistor Q3 back to the emitter of the earlier stage transistor Q1 through my feedback circuit 10. While the circuit 10 could be a single wire, direct current connection, I prefer it to comprise a series inductor L2 as shown in order to eliminate any alternating current or radio frequency currents from the feedback voltage. Thus, only direct current, indicative of the voltage supplied by the feedback resistor R7, is supplied to the emitter of the transistor Q1. It will be seen that this direct current voltage supplies the only bias and direct current ground connection for the emitter of the transistor Q1. This voltage is indicative of the radio frequency power supplied by the transistor Q3. As this radio frequency power increases, the voltage of the circuit 10 becomes more positive which tends to decrease the output power of the transistor Q1. Conversely, as this radio frequency power decreases, the voltage of the circuit 10 becomes less positive, which tends to increase the output power of the transistor Q1. Thus, my circuit provides a feedback which provides a direct current voltage indicative of the radio frequency power at the later stage transistor Q3. And, as will be explained in connection with FIGS. 2 and 3, this feedback circuit tends to maintain the output of the portion shown in FIG. 1 (as well as the subsequent stages) more nearly constant.

Figure 2:
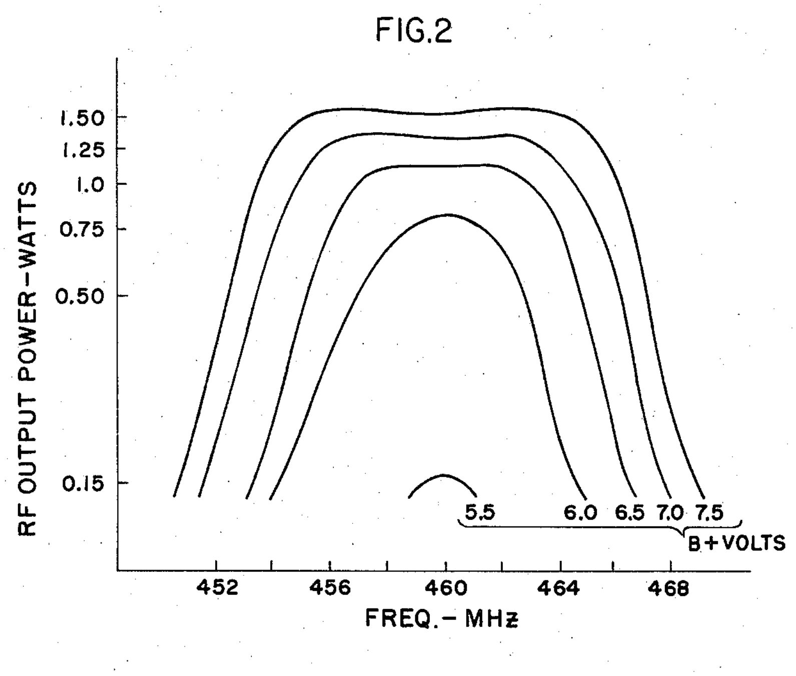
FIG. 2 shows curves illustrating the operation of the transmitter portion of FIG. 1 without my regulator circuit.

In FIG. 2, I have shown curves illustrating the operation of a radio transmitter (including the circuit portion of FIG. 1 and the indicated driver and power amplifier) without the feedback or regulator circuit of my invention. The curves of FIG. 2 show how the radio frequency output power of the power amplifier varies with frequency for five different supply voltages B+ (such as supplied by a battery) at the nominal level of 7.5 volts, and downward in half volt increments to 5.5 volts. In the curves of FIG. 2, it will be seen that as the voltage supply B+ diminishes, the rf output power also decreases; and that after the supply voltage falls to 6 volts, the rf output power has decreased from 1.5 watts to 0.75 watts, and falls off considerably as the radio frequency varies from its center frequency of 460 megahertz. Actually, once the voltage decreases below 6.5 volts, the rf output power is insufficient for many conditions or functions. And clearly, when the voltage reaches 5.5 volts, the rf output power is almost useless.

Figure 3:
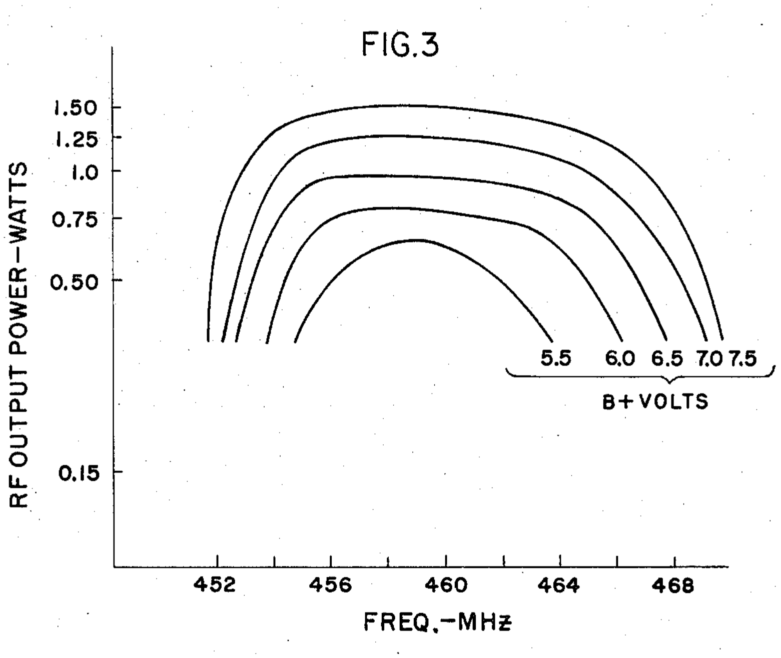
FIG. 3 shows curves illustrating the operation of the transmitter portion of FIG. 1 with my regulator circuit.

However, if the circuit of FIG. 1 includes the feedback circuit 10 in accordance with my invention, the results are considerably improved as illustrated by the curves of FIG. 3. These curves show how the radio frequency output power of the power amplifier varies with frequency for the same five supply voltages B+ used in obtaining the curves of FIG. 2. In FIG. 3, it will be seen that useful rf power is still obtained although the supply voltage B+ decreases to 5.5 volts; whereas in FIG. 2, the rf power output was almost useless for this 5.5 volts. Thus, my feedback circuit provides a better radio frequency power output, even though the transmitter uses transistors and is supplied by a voltage (such as from a battery) which varies considerably.

In summary it will be seen that I have provided a new and useful regulator of feedback circuit which derives a voltage indicative of output radio frequency power, and which feeds this voltage to an earlier radio frequency transistor in the transmitter. The feedback circuit tends to maintain the transmitter radio frequency output power at a more nearly constant, despite the fact that the transmitter uses transistors and battery power. My feedback circuit is a relatively simple one, and may be easily provided in an existing transmitter by making the feedback connection from a later stage transistor to an early stage transistor which is biased only by voltage from my feedback circuit. While I have only shown one embodiment of my invention, persons skilled in the art will appreciate that modifications may be made. For example, the feedback circuit may be provided between other radio frequency stages, whether the stages are used for amplification or for frequency multiplication, or for both amplification and multiplication. The circuit may be used with PNP type transistors as well as the NPN type transistors shown in FIG. 1. Therefore, while my invention has been described with reference to a particular embodiment, it is to be understood that modifications may be made without departing from the spirit of the invention or from the scope of the claims.

What I claim as new and desire to secure by Letters of the United States is:

1. In a radio transmitter having a plurality of radio frequency amplifier or multiplier stages comprising capacitively coupled NPN transistors powered by a battery, a circuit for maintaining the radio frequency output power of said stages more nearly constant despite changes in battery voltage, said circuit comprising:

a. a feedback resistor connected in series between the emitter of the transistor in a later one of said stages and a negative terminal of said battery for developing a voltage across said resistor that varies as a function of the radio-frequency power produced by said last stage transistor;

b. and a direct current connection between said resistor and the emitter of the transistor in an earlier one of said stages to provide the sole bias and direct current path between said emitter of said earlier stage transistor and said negative terminal of said battery, said sole bias and direct current path having a polarity to cause the radio-frequency power amplification of said earlier stage transistor to vary inversely as a function of the radio-frequency output power produced by said later stage transistor.

2. The circuit of claim 1 wherein said direct current connection includes a series inductor.

* * * * *